J. D. JONES.
TIRE TIGHTENER.

No. 249,242.  Patented Nov. 8, 1881.

Witnesses
C. H. McCoy
Geo. A. Moortfe

Inventor
James Daniel Jones
per A. H. Perry
Atty

UNITED STATES PATENT OFFICE.

JAMES D. JONES, OF ERATH COUNTY, TEXAS, ASSIGNOR OF ONE-HALF TO A. H. PERRY, OF SAME PLACE.

TIRE-TIGHTENER.

SPECIFICATION forming part of Letters Patent No. 249,242, dated November 8, 1881.

Application filed October 29, 1879.

*To all whom it may concern:*

Be it known that I, JAMES DANIEL JONES, of Erath county and State of Texas, have invented a new and useful Improvement in Tire-Tighteners for Carriages, Wagons, and other Vehicles, of which the following is a specification.

This invention relates to tire-tighteners for vehicle-wheels; and it consists in certain improvements in the construction of the same, which will be hereinafter fully described with reference to the drawings, in which—

Figure 1:
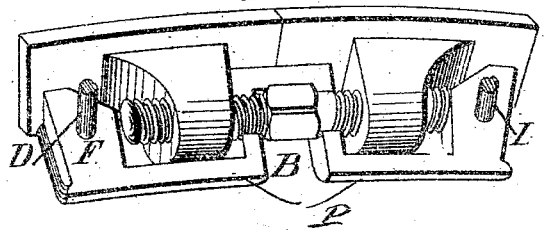
Figure 2:
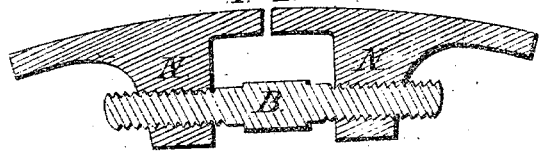
Figure 3:
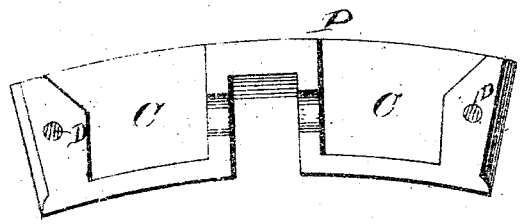

Figure 1 is a perspective view of the tightening device. Fig. 2 is a vertical longitudinal sectional view; and Fig. 3 is a detail view of one of the parts of the metallic felly forming a part of my invention.

Corresponding parts in the several figures are denoted by like letters of reference.

In the annexed drawings, T T represent the adjoining ends of the tire, which, instead of being made in a single ring or piece, is cut, as shown, the ends being provided with lugs projecting downwardly and threaded, so as to form nuts N, as shown. The said nuts N are threaded in opposite directions, so as to accommodate a double-threaded bolt, B, having a suitable seat, enabling it to be operated by a wrench, so as to properly space the nuts or threaded projections N, and consequently the tire.

The wheel to which this invention is applied is to be provided with a felly, made of cast metal in two longitudinal sectional pieces, P, connected by bolts D, and formed with chambers C for the nuts N, and with a passage for the tightening-bolt B.

It is obvious that by this construction the tire may be expanded or contracted to suit any incidental circumstances without necessitating the removal or disturbance of any part of the wheel of which this device forms an integral part.

Having thus described my invention, I claim and desire to secure by Letters Patent of the United States—

1. The herein-described metallic felly, consisting of two longitudinal parts or sections having chambers C C, formed as herein described, and connected by bolts D D, as and for the purpose set forth.

2. As an improvement in tire-tighteners, the combination, with the cut tire having right-and left-hand threaded projections N N, of the double-threaded bolt B, and the metallic felly consisting of two longitudinal parts or sections, C C, formed as described, and connected by bolts D D, as and for the purpose set forth.

JAMES DANIEL JONES.

Witnesses:
WM. KENNEDY,
JOHN S. HYATT.